INVENTORS
VAITO K. ELORANTA
BENJAMIN C. RUGGLES
BY Brown and Mikulka
and
Robert L. Berger
ATTORNEYS Nov. 30, 1971  V. K. ELORANTA ET AL  3,623,417
SYSTEM FOR UNIFORMLY COATING EXPOSED MOTION
PICTURE FILM WITH PROCESSING FLUID
Filed Nov. 1, 1968  4 Sheets-Sheet 2

INVENTORS
VAITO K. ELORANTA
BENJAMIN C. RUGGLES
BY Brown and Mikulka
and
Robert L. Berger
ATTORNEYS

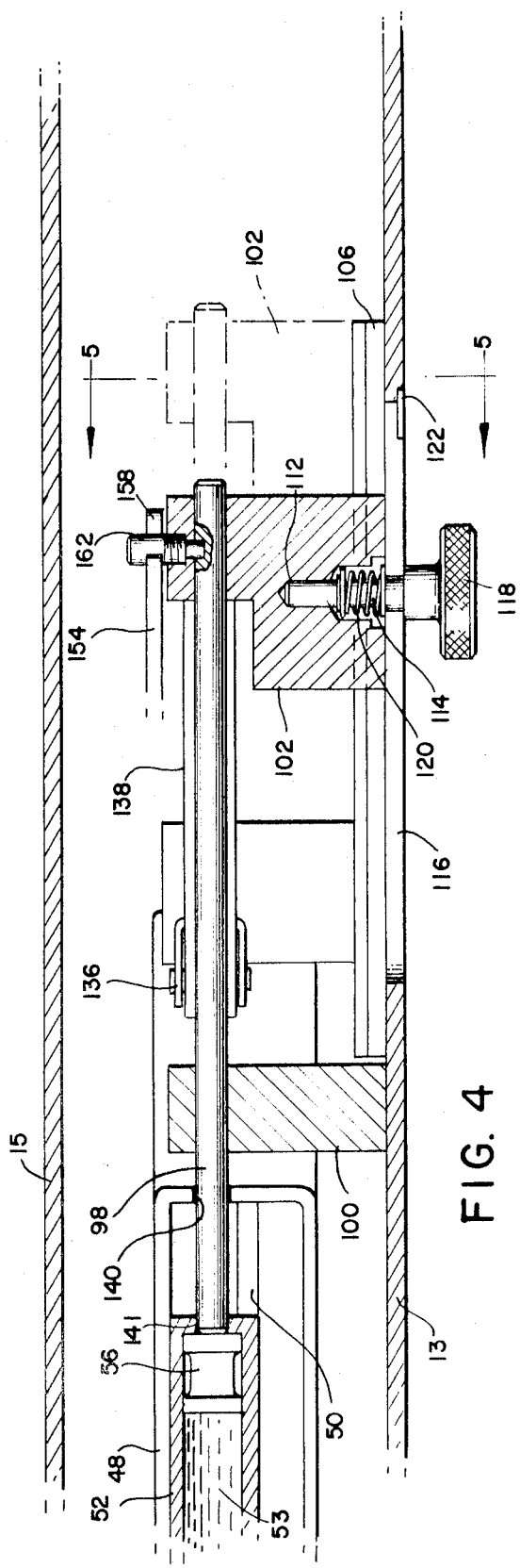
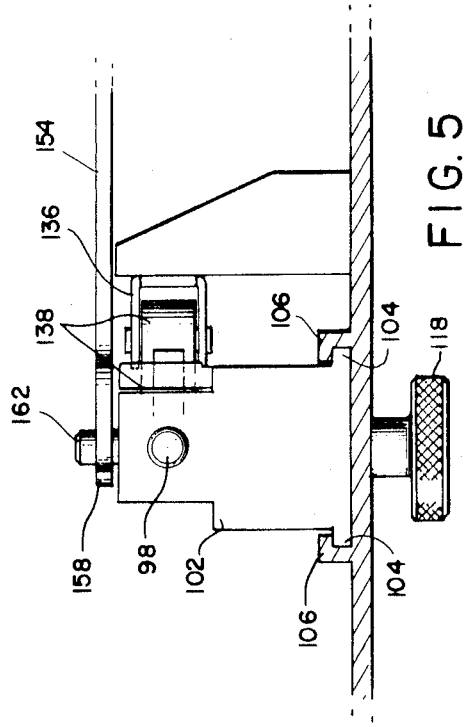

INVENTORS
VAITO K. ELORANTA
BENJAMIN C. RUGGLES
BY Brown and Mikulka
and
Robert L. Berger
ATTORNEYS United States Patent Office 3,623,417
Patented Nov. 30, 1971

3,623,417
SYSTEM FOR UNIFORMLY COATING EXPOSED MOTION PICTURE FILM WITH PROCESSING FLUID
Vaito K. Eloranta, Needham, and Benjamin C. Ruggles, Gloucester, Mass., assignors to Polaroid Corporation, Cambridge, Mass.
Filed Nov. 1, 1968, Ser. No. 772,789
Int. Cl. G03b 17/50
U.S. Cl. 95—89 R                                     31 Claims

ABSTRACT OF THE DISCLOSURE

A motion picture system utilizing a compact multipurpose cassette containing reel means for transporting a strip of film across a film gate and useful during exposure, processing and projection operations. An applicator containing processing fluid is positioned within the cassette in operable relationship with the exposed film strip while it is being transferred from one reel to another. Various unique features are included to insure that a uniform coating of processing fluid is applied to the exposed film strip including means for slidably mounting the applicator within the cassette so that it can be selectively brought into and taken out of contact with the film strip, a self-aligning support plate disposed on the opposite side of the film strip from the applicator, spring means for yieldably restraining the applicator against the film strip, a negator spring to provide a constant force on the processing fluid in the applicator and a motor control system to impart a constant speed to the film strip as it contacts the applicator. Additionally, a folded tape is employed to initially seal the orifice of the applicator when it is spaced from the exposed film strip and which is automatically stripped from the orifice as the applicator is brought into contact with the exposed film.

BACKGROUND OF THE INVENTION

Field of invention

This invention relates to motion picture photography, and more particularly, to improved apparatus for applying a uniform coating of processing fluid to an exposed strip of motion picture film.

Description of the prior art

Certain important improvements have been made in recent years to simplify the job of home motion picture photography. For example, film handling cassettes are now available which are adapted to be quickly mounted as a unit into a camera for exposure purposes. After the film has been exposed, the cassette can be quickly removed from the camera and mailed to a processing laboratory.

Also, specially designed projectors are being marketed which utilize quick mounting cassettes containing the developed film. These systems not only greatly simplify the projection operation, but also provide a permanent storage container for the film, i.e., a cassette from which it is never necessary to withdraw the film for projection purposes.

However, neither of these significant improvements has eliminated the major inconvenience associated with home motion picture photography, i.e., the time delay between the taking of the film and its availability for projection. Additionally, while camera cassettes simplify the procedures for loading film into and removing film from a camera, they do not simplify the multi-step laboratory development process which requires repackaging of the film for projection purposes.

The field of still photography is no longer hampered by extensive periods of delay associated with processing exposed film. The impact on the public of the one-step photographic process employing diffusion transfer techniques is a matter of record and generally well known. The home photographer can now enjoy the fruits of his efforts in a matter of seconds. This important convenience has been available to the still photographer for many years. Important technology advances now make it possible for the home photographer interested in motion pictures to enjoy this same convenience. Radically different motion picture systems have now been developed employing multi-purpose compact cassette permitting the photographer himself to quickly and easily process and project the film strip shortly after the pictures have been taken. Exemplary of such new and unique systems is that described in copending application Ser. No. 755,901 of Edwin H. Land filed Aug. 28, 1968, which application is assigned to the assignee of the present invention.

In commercial and industrial operations such rapid processing and projection systems are not only an improvement as a matter of convenience, but have other important effects as well. For instance, motion picture news reel programs can be presented on television to the viewing public shortly after events of interest have occurred and been photographed.

Considerable funds and efforts are currently being expended to further improve and refine these rapid processing and projection systems in order to reduce their cost, to further simplify the task of the operator, and to improve the quality of the final product. In some of these new systems, such as that described in the first aforementioned copending application, the development chemicals are initially stored in an applicator of the cassette itself from which they are expressed onto the motion picture film strip. The present invention is directed to apparatus for improving the nature of the coating of development chemicals obtained in systems of this general type.

It is therefore a primary object of this invention to provide an improved applicator for use in applying processing fluid onto a strip of exposed motion picture film which can readily be brought into operative relationship with the film and withdrawn therefrom.

A further object of this invention is to provide an applicator of the type indicated which can be accurately aligned with the surface of an exposed film strip when in contact therewith.

Another object of this invention is to provide an applicator of the type indicated which automatically accommodates any dimensional imperfections in or on the motion picture film strip itself.

Still another object of this invention is to provide an applicator of the type indicated which expresses a uniform amount of processing fluid onto an exposed motion picture film strip during the entire period of its operation.

An additional object of this invention is to provide an applicator of the type indicated which minimizes streaking in the surface of the processing fluid coating on the film strip.

A still further object of this invention is to provide simple and efficient means for drawing a strip of exposed motion picture film at a uniform speed across an applicator of the type indicated.

Additionally, an object of this invention is to provide simple and inexpensive means for sealing an applicator of the type indicated.

Also, an object of this invention is to provide a multipurpose compact motion picture film cassette which can be employed during exposure and processing operations and which effectively facilitates the application of a uniform coating of processing fluid onto an exposed strip of film during the processing stage.

Further, an object of this invention is to provide a multi-purpose compact motion picture film handling cassette which can be used during exposure, processing and projection operations and in which a uniform coating of processing fluid can effectively be applied to an exposed film strip during the processing operation.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 4 is a view of the projector's mechanism for exerting a constant force on the processing fluid taken along line 4—4 of FIG. 1;

FIG. 5 is a view of the projector's mechanism for exerting a constant force on the processing fluid taken along line 5—5 of FIG. 4;

SUMMARY OF THE INVENTION

Figure 1:
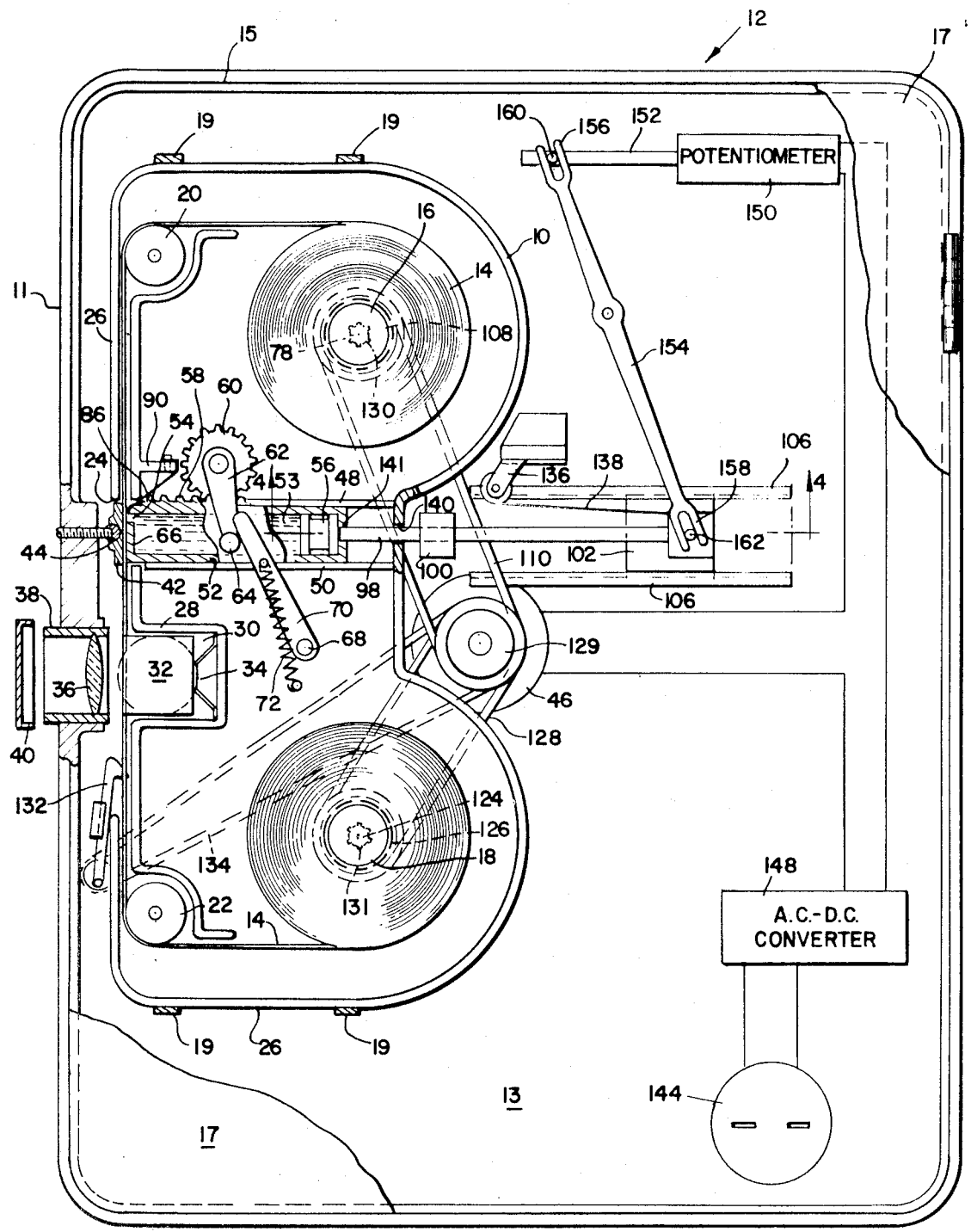
FIG. 1 is a front elevation view, partially in section, of a motion picture film handling cassette mounted in a projector, both embodying features of this invention.

A preferred embodiment of this invention briefly comprises a unique multi-purpose compact motion picture film handling cassette in which the film is permanently retained during exposure, processing, projection and editing operations. The cassette is provided with a film gate and contains reel means, to which the ends of a motion picture film strip are permanently attached and which, further, are adapted to reversibly transport the motion picture film across the film gate when connected to appropriate external drive means. This cassette is adapted to be initially utilized in a motion picture camera for exposure purposes. Subsequently, after the film has been exposed, the cassette may be removed from the camera and mounted in a projector which facilitates both processing and projection of the film.

As the cassette is mounted in the projector, the projector's drive means engage the reel means of the cassette to facilitate selective reversible transport of the film strip across the film gate. An applicator containing processing fluid is slidably retained within this cassette and can be displaced into contact with a section of the exposed film strip after the cassette is mounted in the projector. When the applicator is in contact with the film strip, the film strip itself is slidably engaged by and between the applicator and a self-aligning support plate of the projector, and the applicator is yieldably restrained in this position under a spring force. A rod mounted in the projector is adaptable to be brought into contact with a plunger of the applicator under the constant force of a negator spring so as to cause the processing fluid in the applicator to be expressed through its orifice onto the film strip. This rod is also connected to a variable resistance electric element in series with the projector's motor whereby the speed of the motor is controlled as a function of the position of the plunger within the applicator. In this manner the film strip is caused to maintain a relatively constant rate of travel across the face of the applicator.

The applicator's orifice is initially sealed by the end of a folded tape, the other end of which is mounted to a stationary member of the cassette. As the applicator is displaced into contact with the film strip, the tape is thus automatically peeled away from the orifice. Additionally, the edge of the applicator's orifice in contact with the coating of processing fluid on the film strip is tapered so as to eliminate streaking in the coating.

All of these novel and unique features facilitate the application of an extremely uniform coating of processing fluid onto the exposed film strip.

A light reflecting element is mounted in a recess of the cassette structure provided behind the film gate so that, when the cassette is mounted in the projector, it is in operative relationship with the projection system of the projector.

As indicated, the cassette is initially mounted in a camera for exposure operations. During this operation, the film is transported across the film gate from a supply reel to a take-up reel. After exposure, the cassette is removed from the camera and mounted in the projector. The applicator is brought into contact with the film strip which is supported against the self-aligning support plate and yieldably restrained in this position. The slidable rod in the projector is then caused to engage the applicator's plunger under the force of the negator spring. With the projector's projection system deenergized, the projector's motor draws the film strip from the take-up reel across the applicator onto the supply reel of the cassette. During this operation, the speed of the motor is automatically adjusted to impart a constant rate of travel to the film strip in front of the applicator. After the processing fluid has been applied to the entire length of exposed film strip, the rod in the projector connected to the negator spring and the cassette's applicator are returned to their original positions and the projection system of the projector may be energized. As the take-up reel is driven by the projector's motor, the fully processed film strip passes in front of the film gate in operative relationship with the projection system, facilitating a viewing of the developed film on an appropriately positioned screen. Subsequent viewings of the film can be effected by operating the projector in the conventional, i.e., projection only mode.

Editing of the film can readily be accomplished by withdrawing a loop, including the section of interest, from the film gate of the cassette and removing sections thereof and/or adding sections thereto.

Alternate embodiments are described for displacing the applicator into contact with the film and for yieldably restraining it in such position and in which the self-aligning support plate is mounted in the cassette itself rather than in the projector.

DESCRIPTION OF THE PREFERRED EMBODIMENT

A currently preferred embodiment of this invention makes use of a film structure which comprises both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer-reversal processes for the projection of black-and-white images, a silver halide developer and a silver halide solvent are applied in an aqueous alkaline solution to a photoexposed silver halide stratum or emulsion, where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive print visible.

However, as indicated above, the positive print may be rendered visible without separation of the silver halide and silver-receptive strata. For example, the silver-receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that presents a good image for projection purposes as long as they are contained on a transparent support. Since the silver halide stratum and the silver-receptive stratum may not be separated, an overall simplification of the silver transfer-reversal process is achieved.

A composite film assembly of this type as well as processing compositions for producing a fully developed black-and-white image without the necessity of removing the developed negative image after processing are shown in prior U.S. Pat. No. 2,861,885 of Edwin H. Land which issued on Nov. 25, 1958. Other composite film assemblies capable of producing developed full-color images without the necessity of removing the developed emulsion are shown in prior U.S. patents of Edwin H. Land Nos. 2,726,154 issued Dec. 6, 1955 and 2,944,894 issued July 12, 1960. It should be noted that the present invention is not directed to the chemistry by which images are developed in the photosensitive emulsion and transferred to an image-receiving stratum. However, in the practice of this invention, whether the film employed is black-and-white film or color film, at the present time the preferred embodiment of this invention employs film of a type not requiring the removal of the negative emulsion after it is developed.

Referring now to FIG. 1 of the drawings, a motion picture film cassette 10 is shown mounted in a projector 12, the housing of which consists of a frame member 11 enclosed by a rear panel 13 and a front panel 15. Hinged to, and forming part of, the projector's front panel 15 is a door 17. To facilitate mounting of the cassette 10, the projector 12 is provided with spring clamps 19 which extend inwardly from the rear panel 13. The cassette 10 contains a strip of motion picture film 14, the respective ends of which are permanently affixed to a supply reel 16 and a take-up reel 18. In traveling from the supply reel 16 to the take-up reel 18, the film strip 14 sequentially passes around idlers 20 and 22, and, as will be subsequently explained in more detail, the reels 16 and 18 are adapted to engage drive means external of the cassette, such as that of the projector 12, whereby the film strip 14 can be selectively transported from the supply reel to the take-up reel and vice versa.

In traveling between idler 20 and idler 22, the film strip 14 traverses a film gate 24 provided in the housing 26 of the cassette 10. A portion 28 of the cassette's housing 26 is configured to provide a recess 30 behind the film 14 as it traverses the film gate 24. Mounted within this recess 30 is a light reflecting element 32 which may advantageously take the form of the prism described in copending application Ser. No. 767,609 filed Oct. 15, 1968, now abandoned, in the name of Herbert A. Bing and assigned to the assignee of the present invention. Support is provided for the film strip 14 as it passes in front of the recess 30 by this light reflecting element 32. When the cassette 10 is mounted in the projector 12, the light reflecting element 32 is positioned in operative relationship with the projector's projecting system which includes an illumination system 34 and a lens 36. The lens 36 is mounted in a flanged opening 38 of the projector 12 which is provided with a dust cover 40.

The projector includes a motor 46 which is connected to a shaft 78 through a slip clutch 108 by a belt 110 and to a shaft 124 through a slip clutch 126 by a belt 128. These shafts 78 and 124 extend inwardly from and are rotatably mounted to the projector's rear panel 13. A clutch 129 associated with the motor 46 permits the motor to alternately drive either shaft 78 or shaft 124. When the cassette 10 is positioned in the clamps 19, shaft 78 engages a recess 130 of the supply reel 16, while shaft 124 engages a recess 131 of the take-up reel 18. The projector 12 also includes a conventional claw mechanism 132 which is connected to the motor 46 through a belt 134 whenever the motor drives the take-up reel 18 and which engages the sprocket holes of the film strip 14 to advance the film across the film gate 24 in intermittent steps. Additionally, as is conventional, a rotating blade shutter (not shown) is mounted to the projector's rear panel 13 so as to be disposed between the illumination system 34 and the light reflecting element 32 and geared or otherwise appropriately connected to the claw mechanism 132.

Idler 20, around which the film 14 passes on its way from the supply reel 16 to the film gate 26, may if desired be mounted on a movable post spring biased toward the corner which it occupies in the cassette 10 and capable of being moved resiliently inwardly away from that corner. Concurrently, idler 22 may be designed in accordance with current practice to provide a snubbing action. This represents one way to minimize strain on the film strip 14 by the intermittent action of the claw mechanism 132 whenever the film strip is transported from the supply reel 16 to the take-up reel 18.

Also, when the cassette 10 is mounted in the projector 12, a support plate 42 of the projector extends into the cassette's film gate 24 to about the film strip 14. This support plate 42 is mounted on a bearing 44 extending from the frame member 46 of the projector so that it can pivot in any direction on the bearing for purposes which will subsequently become apparent. The cassette 10 includes guide plates 48 and 50 in which an applicator 52 is slidably retained. Viscous development chemicals 53 are contained within the applicator 52 and are adaptable to being expressed through an orifice 54 under a force applied thereon by a plunger 56 slidably mounted in the applicator. Formed on one edge of the applicator 52 is a rack 58 which is engaged by a pinion 60 rotatably mounted in the cassette 10. An arm 62, external of the cassette 10 having a handle 64 and connected to the pinion 60, can be rotated to cause the applicator 52 to slide in either direction between the guide plates 48 and 50. When the pinion 60 is rotated in a clockwise direction as viewed in FIG. 1, the applicator 52 will be brought into contact with the film strip 14 and the support plate 42 will automatically align itself and the section of the film strip which it abuts with the front face 66 of the applicator. At this time the film strip 14 is slidably engaged between the self-aligning support plate 42 and the applicator 52.

Figure 2:
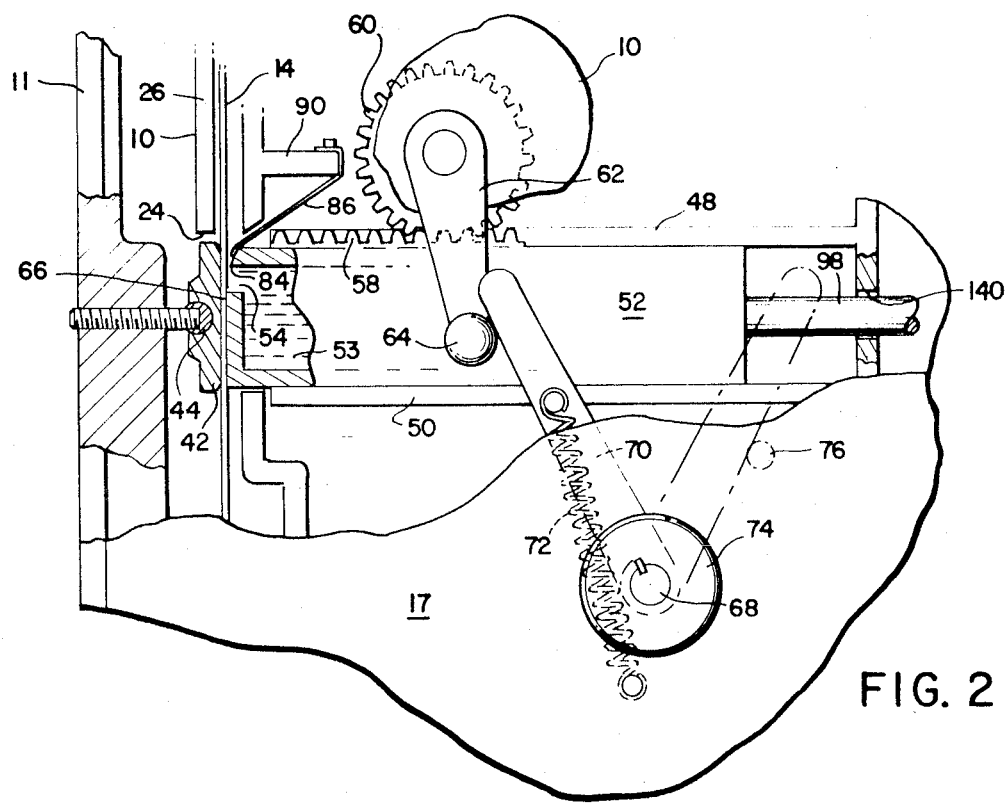
FIG. 2 is an enlarged front elevation view, partially in section, showing the mechanism of the embodiment of this invention illustrated in FIG. 1 for urging the applicator against the exposed film strip.

As may best be seen in FIG. 2, a pin 68 is rotatably mounted through the projector's door 17. An arm 70 extends from the inner end of the pin 68 and is connected to an over-the-center spring 72. The other, or outer end of the pin 68 is provided with a hand knob 74. The initial position of the arm 70 is shown in phantom in FIG. 2, in which position the arm is restrained against a stop 76 under the force of the spring 72. After the pinion arm 62 has been rotated to bring the applicator 52 into contact with the film strip 14, the projector's door 17 may be closed and the hand knob 74 turned in a counterclockwise direction as viewed in FIG. 2 to displace the arm 70 from its initial position, shown in phantom, into contact with the handle 64. This arrangement continually urges the applicator 52 against the film strip 14 in a yieldable manner, i.e., under the resilient force of the spring 72.

Figure 3:
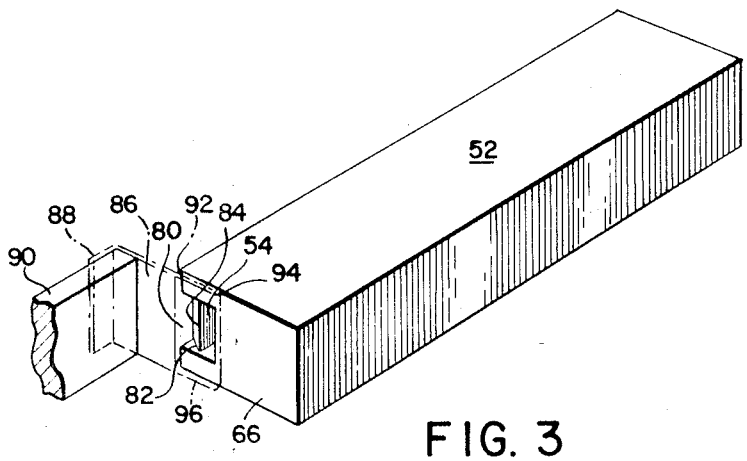
FIG. 3 is a perspective view showing the seal employed in connection with the applicator of this invention.

FIG. 3 depicts the applicator 52 when it is in its initial position, within the cassette 10, i.e., out of contact with the film strip 14. Its front face 66 is substantially flat but is provided with a recessed portion 80 communicating with the orifice 54. The orifice 54 is configured with a taper 82 to provide a knife-like edge 84. In this manner, after the processing fluid 53 has been expressed through the orifice 54 onto the exposed film strip 14, there is only a line contact along the knife-like edge 84 between the applicator 52 and the fluid coating on the film and streaking in the coating's surface is virtually eliminated.

As may be seen in FIG. 3, a strip of material 86, such as vinyl, has one of its ends 88 permanently affixed to an inwardly extending lip 90 of the cassette 10. The other end 92 of the strip of material 86 is provided with an adhesive surface 94 which is attached to the applicator 52 so as to cover its orifice 54 when it is in its initial position within the cassette 10. As may be seen in this same figure, a fold 96 is provided in the strip of material 86 between the applicator 52 and the lip 90. Consequently, as the pinion arm 62 is turned in a clockwise manner as viewed in FIGS. 1 and 2 to bring the applicator 52 into contact with the film strip 14, the strip of material 86 will automatically be peeled away from the applicator so as to expose or unseal its orifice 54 (see FIG. 2).

Referring now to FIGS. 1, 4 and 5 of the drawings, the projector 12 includes a rod 98 slidably positioned within a mount 100 extending inwardly from the projector's rear panel 13. One end of this rod 98 is affixed to a block 102 which is provided with a flanged portion 104 slidably engaging a guide track 106 mounted on the inner face of the projector's rear panel 13.

One end 112 of a pin 114 is connected to the block 102. This pin 114 extends through a slot 116 provided in the projector's rear panel 13 and a hand knob 118 is connected to its other end. Mounted on the pin 114 interiorly of the projector is a spring 120 which continually urges the hand knob inwardly against the exterior face of the rear panel 13. It will thus be recognized that, when the hand knob 118 is manipulated to displace the block 102 to its furthermost right-hand position as viewed in FIG. 4 along the guide track 106, the force of the spring 120 will cause the hand knob to seat in a recess 122 provided in the projector's rear panel 13 and communicating with the slot 116. This action causes the block 102 to be locked in position against the projector's rear panel 13 until such time as the hand knob 118 is pulled out of the recess 122.

Rotatably mounted in a bracket 136 connected to the projector's rear panel 13 is a negator spring 138. The other end of this negator spring 138 is affixed to the block 102 and, consequently, the force of the negator spring continually urges the block 102, and the rod 98 connected thereto, to be displaced in a left-hand direction as viewed in FIGS. 1 and 4 along the guide track 106.

As illustrated in both FIG. 1 and FIG. 4, the rod 98 is aligned in registry with apertures 140 and 142 of the cassette 10 and applicator 52, respectively. Thus, after the cassette 10 has been mounted in the projector 12 and the applicator 52 brought into contact with the film strip 14, the hand knob 118 can be pulled out of the recess 122 and the force of the negator spring exerted on the block 102 will cause it to slide along the guide track 106 to a position where the rod 98 has entered the cassette 10 through its aperture 140 and further entered the applicator through its aperture 141 to seat against the plunger 56. Thus it will be seen that the film gate 24 constitutes an opening that serves to provide the cassette 10 with a film exposure station where progressive incremental sections of the film strip 14 may be exposed to image-carrying light rays when the cassette is mounted in an appropriate camera, and that serves to provide the cassette with a film projection station where light rays from a projection illumination system 34 may be directed through progressive incremental sections of the film strip when the cassette is mounted in the projector 12. At the same time, the cassette 10 includes a normally inoperative film processing station comprising the applicator 52 which may be selectively rendered operable.

As may be seen in FIG. 1, the projector 12 is provided with an electrical receptacle 144 which is connected to the motor 46 through a converter 148 and a variable electrical resistance element (potentiometer) 150 which includes a slidable control arm 152. As the control arm 152 is displaced inwardly of the potentiometer 150, the resistance of the potentiometer gradually increases thereby reducing the speed of the motor 46. An arm 154 pivotally connected from the projector's rear panel 13 has its two ends formed as yokes 156 and 158. The yoke 156 engages a pin 160 extending from the potentiometer's control arm 152 while the yoke 158 engages a pin 162 extending from the block 102. It will therefore be recognized that, after the applicator 52 has been brought into contact with the film strip 14 and the rod 98 into contact with the plunger 56, the speed of the motor 146 will be gradually reduced as the plunger 56 is displaced within the applicator towards the orifice 54. In effect, the rate of travel of the film strip 14 across the applicator 52 is substantially held constant during the entire operation of the applicator even though the film strip itself is being coiled in turns of ever increasing diameters on the reel 16.

OPERATION OF THE PREFERRED EMBODIMENT

To summarize the operation of the preferred embodiment of this invention, the cassette 10 is initially furnished with substantially the entire unexposed film strip 14 coiled on the supply reel 16 and is adapted to be quickly mounted in a motion picture camera (not shown). The reel means of the cassette 10, more specifically the take-up reel 18, engages the camera's drive means whereby an operator can selectively record images on the film strip as it traverses the film gate 24 in passing from the supply reel 16 to the take-up reel 18. During the picture-taking operation, the film 14 is supported across the film gate 24 on the light reflecting element 32 and the applicator 52 is disposed in its furthermost right-hand position within the cassette 10 as viewed in FIG. 1. After the film strip 14 has been completely exposed, the cassette 10 can be quickly removed from the camera and replaced, when desired, by an identical cassette containing unexposed film.

After exposure, the door 17 of the projector 12 can be opened and the cassette 10 mounted in the spring clamps 19. At this time, the hand knob 118 is seated in the recess 122 of the projector's rear panel 13 and the hand knob 74 on the projector's door 17 is in its furthermost clockwise position as viewed in FIG. 2 to seat the arm 70 against the stop 76.

With the projector's door 17 open, the pinion arm 62 is rotated to bring the applicator 52 into contact with the film strip automatically removing the strip of material 86 from the orifice 54 and slidably engaging the film against the self-aligning support plate 42. The door 17 of the projector 12 may then be closed and the hand knob 74 rotated to bring the arm 70 into contact with the handle 64 of the pinion's arm 62. As a result of this operation, the applicator 52 is yieldably restrained against the film strip 14.

The hand knob 118 is then withdrawn from the recess 122, at which time the force of the negator spring 138 will cause the block 102 to slide toward the cassette 10 along its guide track 106. As the block 102 approaches the cassette 10, the rod 98 enters the cassette through its aperture 140 and then the applicator 52 through its aperture 141 to seat against the plunger 56. During this operation, it is desirable for the operator to hold onto the hand knob 118 and to permit it to slowly slide along the slot 116 under the force of the negator spring 138 so that it does not bang against the plunger 56.

Figure 6:
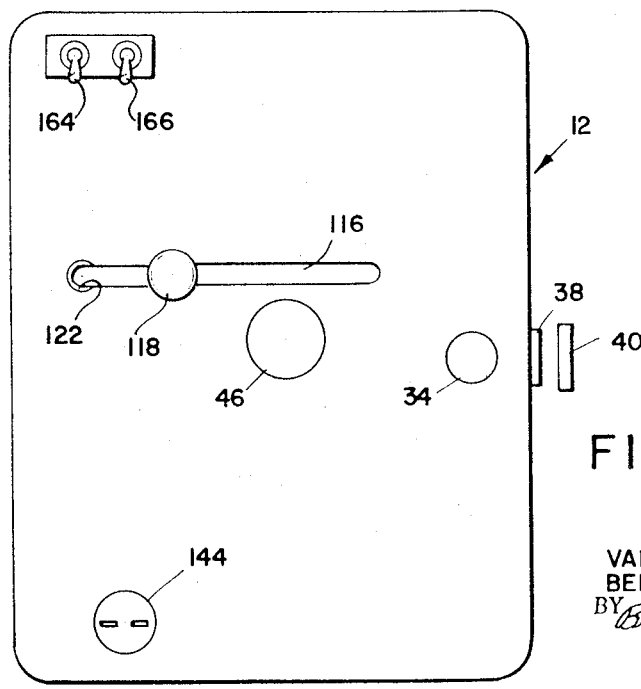
FIG. 6 is a rear elevation view of the projector illustrated in FIG. 1.

The projector's receptacle 144 may then be connected to a source of electrical energy. The motor 46 is energized and connected to the supply reel 16 through the belt 110, slip clutch 108 and shaft 78 by throwing a toggle switch 164 provided on the exterior of the projector's rear panel 13 (see FIG. 6) from its "off" to its "on" position. The exposed film strip 14 is thereby returned from the take-up reel 18 to the supply reel 16 across the front face 66 of the applicator 52. Simultaneously the negator spring 138 exerts a constant force on the development chemicals 53 through the rod 98 and the plunger 56, causing a metered amount of the chemicals to be expressed onto the exposed film strip 14 as it passes in front of the orifice 54. Also, the motion of the arm 154 responsive to the changing position of the block 102 as the development chemicals 53 are expressed from the applicator 52 progressively increases the resistance of the potentiometer 150 thereby effecting a corresponding decrease in the speed of the motor 156. As previously indicated, the net effect of this operation is to maintain a constant rate of travel of the film strip 14 across the applicator 52 even though the film is being coiled in turns of increasing diameters on the supply reel 16.

Conventional means (not shown) are connected to the toggle switch 164 to return that element automatically to its "off" position when all of the exposed film has been coiled on the supply reel 16. Thus, at this point, the motor 46 is de-energized and the slip clutch 108 disengaged.

The hand knob 74 should then be rotated to seat the arm 70 against the stop 76. Also, at this time, the hand knob 118 should be drawn along the slot 116 in the projector's rear panel 13 until it seats in the recess 122. Thus, the rod 98 is withdrawn from the applicator 52 and the cassette 10. The projector's door 17 should again be opened and the pinion arm 62 turned in a clockwise direction as viewed in FIG. 2 to withdraw the applicator 52 from contact with the film strip 14 into its original position within the cassette 10. The projector's door should then be closed, the dust cover 40 removed from the projector's flanged opening 38 and a projection screen (not shown) appropriately positioned in front of the projector's lens 36.

Throwing a toggle switch 166, provided on the back face of the projector's rear panel 13 (see FIG. 6) energizes the illumination system 34 and the motor 146, clutches the motor to the belt 128 and the belt 134 and engages the slip clutch 126. The developed film strip 14 coiled on the supply reel 16 is thus drawn across the film gate 24 onto the take-up reel 18. As the developed film strip 14 traverses the film gate 24 in front of the light reflecting element 32 under the action of the claw mechanism 132, the images recorded thereon are projected through the lens 36 onto the screen (not shown).

Conventional means (not shown) are also connected to the toggle switch 166 to automatically return that element to its "off" position when all of the now developed film 14 has been drawn from the supply reel 16 and coiled on the take-up reel 18. After projection, the film 14 may be returned to the supply reel 16 by operation of the toggle switch 164. The cassette 10 can be removed from the projector 12 for storage purposes and subsequent viewings can be facilitated by merely again mounting the cassette in the projector and appropriate operation of toggle switches 164 and 166.

Editing of the developed film strip 14 can easily be effected. It is only necessary to draw a loop of the film strip 14 from the film gate 24 and to remove sections therefrom or to splice sections thereinto as desired.

Those familiar with the motion picture arts will readily appreciate the novel and highly unique advantages of this system. The applicator is only in contact with the film strip during the time when it is intended to express development chemicals thereonto. Additionally, when it is in contact with the film strip, the self-aligning support plate and yieldable force on the applicator readily accommodate for any misalignment in the system or any imperfections in or on the film strip itself. The constant force of the negator spring exerted against the processing chemicals causes this fluid to be expressed through the applicator's orifice in a continuously uniform manner. Also, the film strip passes in front of the applicator at a constant speed regardless of the amount of the film strip coiled on the supply reel at any particular instant. The tapered nature of the applicator's orifice alleviates streaking in the coating applied to the film. All of these features significantly contribute to providing a unique motion picture system utilizing a compact multi-purpose cassette in which an exposed film strip can be provided with an extremely uniform coating of processing fluid.

DESCRIPTION OF AN ALTERNATE EMBODIMENT

Figure 7:
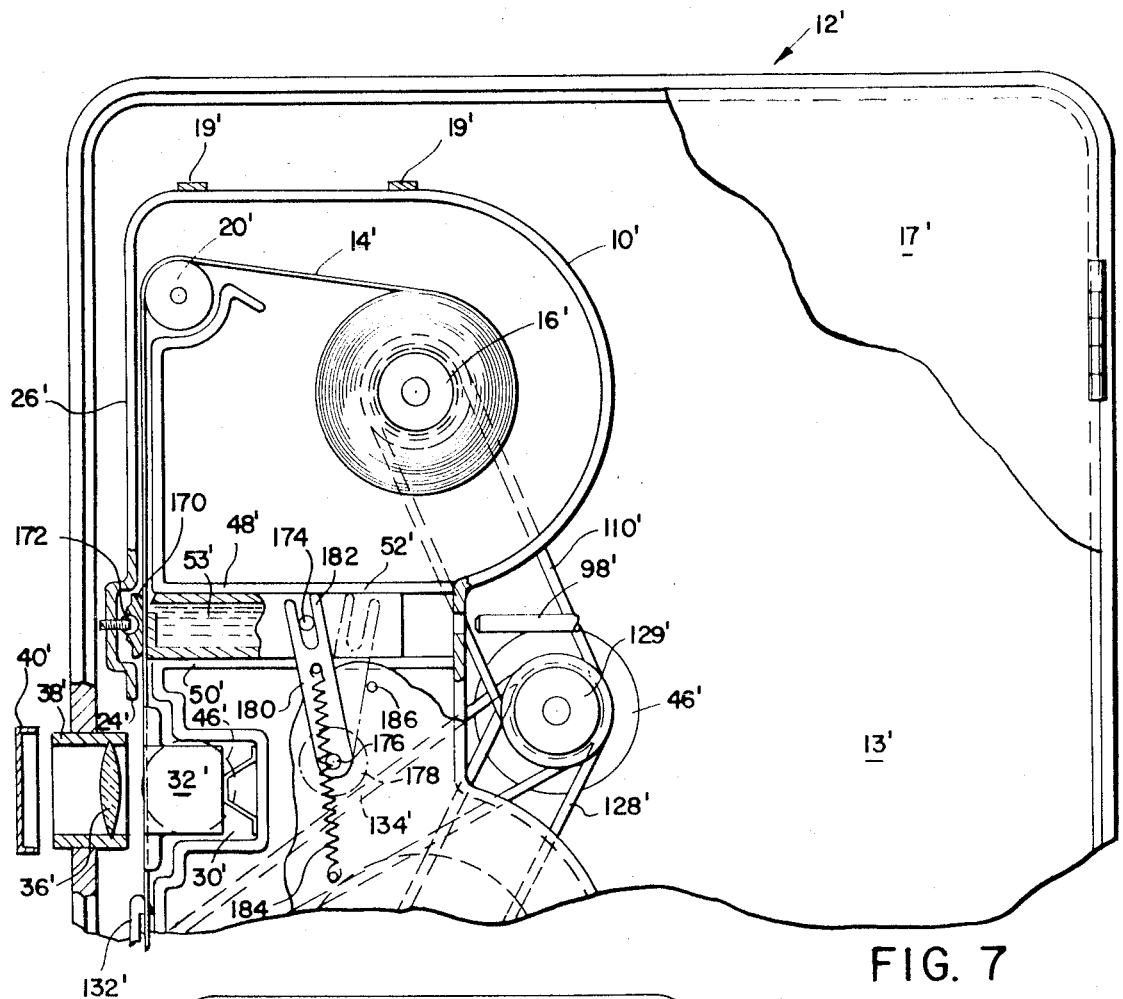
FIG. 7 is a front elevation view, partly in section, illustrating another embodiment of this invention for urging an applicator of a cassette against exposed film strip.

An alternate embodiment of this invention for displacing the applicator within a cassette and for yieldably restraining it against the film strip during the time of its operation is illustrated in FIG. 7 of the drawings. The same numerals primed are employed in that figure to denote parts of that embodiment of the invention which remain substantially unchanged from the embodiment illustrated in FIGS. 1 through 6.

Referring now to FIG. 7 a cassette 10' is shown mounted in a projector 12'. In this case a self-aligning support plate 170 is pivotally mounted on a bearing 172 extending inwardly from the housing 26' of the cassette 10'. This self-aligning support plate 170 abuts the film strip 14 between an idler 20' and a film gate 26'. An applicator 52' is slidably retained between guide plates 48' and 50' of the cassette 10'. Extending from the applicator 52' is a pin 174. Another pin 176 extends through the projector's door 17' and is rotatably connected thereto. Mounted on the exterior end of this pin 176 is a hand knob 178. An arm 180 provided with a yoke 182 is connected to the other end of the pin 176 internally of the door 17'. This arm 180 is also connected to the inside of the door 17' by an over-the-center spring 184. When the hand knob 178 is turned to its furthermost position in a clockwise direction as viewed in FIG. 7, the arm 180 is seated against a stop 186 extending from the inner face of the door 17' under the force of the spring 184.

At the time the cassette 10' is initially mounted in the projector 12', the applicator 52' is in its furthermost position within the cassette away from the film strip 14'. As the projector's door 17' is closed, the applicator's pin 174 is engaged by the yoke 182. By then turning the hand knob 178 in a counterclockwise direction as viewed in FIG. 7 the applicator 52' will slide between the guide tracks 48' and 50' into contact with the film strip 14'. At this time the applicator 52' is yieldably restrained against the film strip 14' under the force of the spring 184 and the film strip is slidably engaged between the cassette's self-aligning support plate 170 and the applicator.

This invention may be practiced or embodied in still other ways without departing from the spirit or essential character thereof. For instance, the potentiometer 150 may be positioned in alignment with the rod 98 in which case its control arm 152 may merely constitute an extension of that rod. Such an arrangement would eliminate the requirement for the pivoted arm 154. Additionally, as illustrated in the drawings the cassette includes a pair of coplanar reels whose axes of rotation are spaced from one another. This invention is obviously equally applicable to cassettes in which a pair of reels are positioned side by side on a common axis. Also, the invention is applicable to an arrangement wherein the film is in the form of an endless strip. The preferred embodiments described herein are therefore illustrative and not restrictive, the scope of the invention being indicated by the appended claims and all variations which come within

What is claimed is:

1. A motion picture film handling system comprising:
   a housing;
   drive means mounted in said housing;
   a cassette, having a film gate, adapted to be releasably mounted in said housing comprising a strip of film coiled therein, means for advancing said film from an initial position within said cassette across said film gate when connected to said drive means, said film advancing means of said cassette engaging said drive means when said cassette is mounted in said housing, and a normally inoperative processing station including an applicator for applying processing fluid to said film adapted to operably engage said film as it is advanced across said film gate;
   a support surface in said housing extending into said film gate in alignment with said applicator on the other side of said film therefrom; and
   means for selective rendering said processing station operable including means for causing said film to be slidably engaged by said surface and said applicator.

2. The system of claim 1 wherein said support surface is self-aligning.

3. The system of claim 1 comprising film projection means within said housing in selective operative relationship with said film as it traverses a portion of said film gate when said cassette is mounted in said housing.

4. The system of claim 1 additionally including means for yieldably restraining said applicator against said film when said processing station is rendered operable.

5. The system of claim 1 wherein said processing fluid is contained in said applicator and said applicator has an orifice through which said fluid can be expressed onto said film and includes a plunger on the opposite side of said fluid from said orifice whereby inward displacement of said plunger urges said fluid through said orifice towards said film and said means for selectively rendering said processing station operable additionally includes means for urging said plunger against said fluid with substantially a constant force regardless of its position within said applicator.

6. The system of claim 1 wherein said drive means includes means for maintaining a substantially constant speed of travel of said film strip past said applicator when said processing station is rendered operable.

7. Apparatus for containing a strip of film and for applying a thin coating of processing fluid thereto when said film is in an exposed condition comprising:
   a cassette;
   a strip of film coiled within said cassette;
   a normally inoperative processing station including an applicator within said cassette for applying processing fluid to said exposed film strip;
   a support surface disposed on the other side of said film from said applicator in alignment therewith;
   means for advancing said exposed film from an initial position within said cassette between said support surface and said applicator;
   means for selectively rendering said processing station operable including means for causing said film to be slidably engaged by said surface and said applicator, said means for causing said film to be slidably engaged by said surface and said applicator comprising means for selectively bringing said applicator into contact with said film from a position spaced therefrom, said means for selectively bringing said applicator into contact with said film from a position spaced therefrom including a rack connected to said applicator and a pinion engaging said rack having a crank arm; and
   means for yieldably restraining said applicator against said film when said processing station is rendered operable including a spring and an arm adapted to engage said crank arm under the force of said spring when said applicator is displaced into contact with said film.

8. Apparatus for containing a strip of film and for applying a thin coating of processing fluid thereto when said film is in an exposed condition comprising:
   a cassette;
   a strip of film coiled within said cassette;
   a normally inoperative processing station including an applicator within said cassette for applying said processing fluid to said exposed film strip;
   a support surface disposed on the other side of said film from said applicator in alignment therewith;
   means for advancing said exposed film from an initial position within said cassette between said support surface and said applicator;
   means for selectively rendering said processing station operable including means for causing said film to be slidably engaged by said surface and said applicator, said means for causing said film to be slidably engaged by said surface and said applicator comprising means for selectively bringing said applicator into contact with said film from a position spaced therefrom, said means for selectively bringing said applicator into contact with said film from a position spaced therefrom including a pin mounted on said applicator and an arm having an elongated slot provided in one end engaging said pin; and
   means for yieldably restraining said applicator against said film when said processing station is rendered operable including a spring connected to said arm whereby the force of said spring is exerted against said pin through said arm when said applicator is displaced into contact with said film.

9. Apparatus for containing a strip of film and for applying a thin coating of processing fluid thereto when said film is in an exposed condition comprising:
   a cassette;
   a strip of film coiled within said cassette;
   a normally inoperative processing station including an applicator within said cassette for applying said processing fluid to said exposed film strip, said processing fluid being contained in said applicator and said applicator having an orifice through which said fluid can be expressed onto said film and including a plunger on the opposite side of said fluid from said orifice whereby inward displacement of said plunger urges said fluid through said orifice towards said film;
   a support surface disposed on the other side of said film from said applicator in alignment therewith;
   means for advancing said exposed film from an initial position within said cassette between said support surface and said applicator; and
   means for selectively rendering said processing station operable including means for causing said film to be slidably engaged by said surface and said applicator and means for urging said plunger against said fluid with substantially a constant force regardless of its position within said applicator.

10. The apparatus of claim 9 wherein said support surface is self-aligning.

11. The apparatus of claim 9 wherein said means for urging said plunger against said fluid with substantially a constant force regardless of its position within said applicator includes a negator spring.

12. The apparatus of claim 9 wherein said means for advancing said exposed film includes means for maintaining a substantially constant speed of travel of said exposed film strip past said applicator when said processing station is rendered operable.

13. Apparatus for containing a strip of film and for applying a thin coating of processing fluid thereto when said film is in an exposed condition comprising:

a cassette;

a strip of film coiled within said cassette;

a normally inoperative processing station including an applicator within said cassette for applying said processing fluid to said exposed film strip, said fluid being contained in said applicator and said applicator having an orifice through which said fluid can be expressed onto said film and including a plunger disposed in operable relationship to said fluid whereby inward displacement of said plunger within said applicator urges said fluid outwardly through said orifice towards said film;

a support surface disposed on the other side of said film from said applicator in alignment therewith;

means for advancing said exposed film from an initial position within said cassette between said support surface and said applicator;

means for selectively rendering said processing station operable including means for causing said film to be slidably engaged by said surface and said applicator and means for urging said plunger against said fluid with substantially a constant force regardless of its position within said applicator; and means for yieldably restraining said applicator against said film when said processing station is rendered operable.

14. The apparatus of claim 13 wherein said means for urging said plunger against said fluid with substantially a constant force regardless of its position within said applicator includes a negator spring.

15. Apparatus for containing a strip of film and for applying a thin coating of processing fluid thereto when said film is in an exposed condition comprising:

a cassette;

a strip of film coiled within said cassette;

a normally inoperative processing station including an applicator within said cassette for applying said processing fluid to said exposed film strip, said fluid being contained in said applicator and said applicator having an orifice through which said fluid can be expressed onto said film and including a plunger on the opposite side of said fluid from said orifice whereby inward displacement of said plunger urges said fluid through said orifice towards said film;

a support surface disposed on the other side of said film from said applicator in alignment therewith;

means including a motor for advancing said exposed film from an initial position within said cassette between said support surface and said applicator;

means for selectively rendering said processing station operable including means for causing said film to be slidably engaged by said surface and said applicator and means for continually urging said plunger against said fluid; and means for changing the speed of said motor as a function of the position of said plunger within said applicator when said processing station is rendered operable to maintain a substantially constant speed of travel of said film strip past said applicator as said exposed film strip is advanced from said initial position within said cassette between said support surface and said applicator.

16. The apparatus of claim 15 wherein said means for changing the speed of said motor as a function of the position of said plunger within said applicator includes a variable resistance element in series with said motor and operatively connected to said plunger.

17. Apparatus for containing a strip of film and for applying a thin coating of processing fluid thereto when said film is in an exposed condition comprising:

a cassette;

a strip of film coiled within said cassette;

a normally inoperative processing station including an applicator within said cassette for applying said processing fluid to said exposed film strip, said fluid being contained within said applicator and said applicator having an orifice through which said fluid can be expressed onto said exposed film strip;

a support surface disposed on the other side of said film from said applicator in alignment therewith;

means for advancing said exposed film from an initial position within said cassette between said support surface and said applicator;

means for selectively rendering said processing station operable comprising means for causing said film to be slideably engaged by said surface and said applicator including means for selectively bringing said applicator into contact with said film from a position spaced therefrom; and a seal member removably covering said orifice when said applicator is initially disposed in said position and connected to the structure of said cassette whereby said seal member is automatically removed from said orifice when said applicator is initially displaced from said position into contact with said film.

18. The apparatus of claim 17 wherein an end of said seal member is a folded tape having an adhesive surface disposed outwardly of said fold and adhering to said applicator over said orifice when said applicator is initially in its said position.

19. Apparatus for containing a strip of film and for applying a thin coating of processing fluid thereto when said film is in an exposed condition comprising:

a cassette;

a strip of film coiled within said cassette;

a normally inoperative processing station including an applicator within said cassette for applying said processing fluid to said exposed film strip;

a support surface disposed on the other side of said film from said applicator in alignment therewith;

means for advancing said exposed film from an initial position within said cassette between said support surface and said applicator; and means for selectively rendering said processing station operable including means for causing said film to be slidably engaged by said surface and said applicator;

said fluid being contained in said applicator and the section of said applicator adapted to contact said film when said processing station is rendered operable being substantially flat having a recessed portion and an orifice communicating therewith whereby said fluid can be expressed from said applicator through said orifice onto said exposed film, the edge of said orifice across which said film coated with said processing fluid is transported by said advancing means being tapered to constitute a line contact between said applicator and said coating whereby streaking of the surface of said coating is minimized.

20. A motion picture film handling system comprising:

a housing;

selectively operable projecting means within said housing;

drive means mounted in said housing;

a cassette, having a film gate adapted to be releasably mounted in said housing with said film gate disposed in operative relationship with said projection means comprising a strip of film coiled therein, means for advancing said film from an initial position within said cassette across said film gate when connected to said drive means, said film advancing means of said cassette engaging said drive means when said cassette is mounted in said housing and a normally inoperative processing station for applying processing fluid to said film including an applicator for applying said fluid to said film and a support surface disposed on the opposite side of said film from said applicator and in alignment therewith; and means for selectively rendering said processing station operable including means for causing said film to be slidably engaged by said surface and said applicator.

21. The system of claim 20 additionally including means for yieldably restraining said applicator against said film when said processing station is rendered operable.

22. The system of claim 20 wherein said drive means includes means for maintaining a substantially constant speed of travel of said film strip past said applicator when said processing station is rendered operable.

23. A motion picture film handling system comprising:
a housing;
drive means mounted in said housing;
a cassette, having a film gate adapted to be releasably mounted in said housing comprising a strip of film coiled therein, means for advancing said film from an initial position within said cassette across said film gate when connected to said drive means, said film advancing means of said cassette engaging said drive means when said cassette is mounted in said housing and a normally inoperative processing station for applying processing fluid to said film including an applicator for applying said fluid to said film and a support surface disposed on the opposite side of said film from said applicator and in alignment therewith, said processing fluid being contained in said applicator and said applicator having an orifice through which such fluid can be expressed onto said film and including a plunger on the opposite side of said fluid from said orifice whereby inward displacement of said plunger urges said fluid through said orifice towards said film; and
means for selectively rendering said processing station operable including means for causing said film to be slidably engaged by said surface and said applicator and means for urging said plunger against said fluid with substantially a constant force regardless of its position within said applicator.

24. Apparatus for containing a strip of film, for facilitating the exposure of said film, for applying a thin coating of processing fluid thereto, and for facilitating the projection of visible images formed thereon, comprising:
a cassette comprising an enclosed opaque housing configured to be mounted first in a camera and subsequently in a projector and constructed to facilitate film exposure, processing and projection operations;
an exposure station within said housing;
a normally inoperative processing station within said housing;
an unexposed strip of film initially substantially entirely coiled at a first position within said housing;
first means for progressively advancing said unexposed strip of film from its said first position through said exposure station to facilitate film exposure operations, said advancing means including a first reel mounted in a second position within said housing and adapted to be driven by externally mounted drive means and to which one end of said strip of film is connected;
second means for progressively returning said exposed strip of film from said second position around said first reel through said processing station to its said initial position, including a second reel around which said strip of film is initially coiled with its other end connected thereto and adapted to be driven by externally mounted drive means to effect the coiling of said strip of film therearound in turns of increasing radii, and for progressively transporting said exposed strip of film through said processing station at a substantially constant speed at such time; and
third means for selectively rendering said processing station operable at such time as said strip of film is returned from said first reel to said second reel.

25. A multipurpose film handling cassette comprising:
an enclosed opaque housing configured to be mounted first in a camera and then in a projector to facilitate film exposure, processing and projection operations;
a first reel adapted to be driven about its axis by externally mounted drive means;
a second reel adapted to be driven about its axis by externally mounted drive means;
an unexposed strip of film initially substantially entirely coiled about said first reel with one end thereof connected to said first reel and the other end thereof connected to said second reel;
a film gate disposed in operable relationship with an incremental portion of said strip of film intermediate said first reel and said second reel for access of light rays to incremental portions of said strip of film to facilitate film exposure operations;
first means for treating incremental portions of said strip of film, after exposure thereof, with a processing fluid, said first means being initially disposed in spaced apart relationship to an incremental portion of said strip of film intermediate said first and second reels;
second means for selectively effecting slidable engagement between said first means and said strip of film;
third means for storing a quantity of said processing fluid sufficient to treat the entire length of said strip of film and for feeding said fluid to said first means responsive to a pressure applying force being exerted against said fluid; and
fourth means for selectively exerting a pressure applying force against said fluid, whereby said strip of film may be exposed as it is advanced from said first reel to said second reel, said strip of film and said first means may then be brought into slidable engagement and said exposed film strip may be treated with said processing fluid as it is returned from said second reel to said first reel.

26. Apparatus for containing a strip of film and for applying a thin coating of processing fluid thereto when said film is in an exposed condition comprising:
a cassette;
a strip of film coiled within said cassette;
a normally inoperative processing station within said cassette including a displaceably mounted applicator for applying said processing fluid to said exposed film;
means for advancing said exposed film from an initial position within said cassette along a path transverse said applicator;
means for selectively rendering said processing station operable including means for displacing said applicator from a position spaced apart from said film into slidable engagement with said film, said displacing means including a rack connected to said applicator and a pinion engaging said rack having a crank arm; and
means for yieldably restraining said applicator against said film when disposed in contact therewith including a spring and an arm adapted to engage said crank arm under the force of said spring when said applicator is in contact with said film.

27. Apparatus for containing a strip of film and for applying a thin coating of processing fluid thereto when said film is in an exposed condition comprising:
a cassette;
a strip of film coiled within said cassette;
a normally inoperative processing station within said cassette including a displaceably mounted applicator for applying said processing fluid to said exposed film;

means for advancing said exposed film from an initial position within said cassette along a path transverse said applicator;

means for selectively rendering said processing station operable including means for displacing said applicator from a position spaced apart from said film into slidable engagement with said film, said displacing means including a pin mounted on said applicator and an arm having an elongated slot provided in one end engaging said pin; and means for yieldably restraining said applicator against said film when in contact therewith including a spring connected to said arm whereby the force of said spring is exerted against said pin through said arm when said applicator is in contact with said film.

28. Apparatus for containing a strip of film and for applying a thin coating of processing fluid thereto when said film is in an exposed condition comprising:

a cassette;

a strip of film coiled within said cassette;

a normally inoperative processing station within said cassette including an applicator for applying said processing fluid to said exposed film, said processing fluid being initially retained within said applicator, said applicator including a section adapted to engage said film and to have said processing fluid expressed therethrough onto said film and a plunger disposed on the opposite side of said fluid from said applicator section, whereby inward displacement of said plunger urges said fluid through said applicator section towards said film;

means for advancing said exposed film from its coiled position within said cassette across said applicator section in slidable engagement therewith; and means for selectively rendering said processing station operable as said exposed film is advanced across said applicator section including means for urging said plunger against said fluid with substantially a constant force regardless of its position within said applicator.

29. The apparatus of claim 28 wherein said means for urging said plunger against said fluid with substantially a constant force regardless of its position within said applicator include a negator spring.

30. Apparatus for containing a strip of film and for applying a thin coating of processing fluid thereto when said film is in an exposed condition comprising:

a cassette;

a strip of film coiled within said cassette;

a normally inoperative processing station within said cassette including an applicator for applying said processing fluid to said exposed film, said processing fluid being initially retained within said applicator, said applicator including a section adapted to engage said film and to have said processing fluid expressed therethrough onto said film and a plunger disposed on the opposite side of said fluid from said applicator section, whereby inward displacement of said plunger urges said fluid through said applicator section towards said film;

means including a motor for advancing said exposed film from its coiled position within said cassette across said applicator section in slidable engagement therewith;

means for selectively rendering said processing station operable as said exposed film is advanced across said applicator section including means for urging said plunger against said fluid; and means for changing the speed of said motor as a function of the position of said plunger within said applicator when said processing station is rendered operable to maintain a substantially constant speed of travel of said film across said applicator section.

31. A multipurpose film handling cassette comprising:

an enclosed opaque housing configured to be mounted first in a camera and then in a projector to facilitate film exposure, processing and projection operations;

an unexposed strip of film coiled within said housing;

a film gate for access of light rays to incremental portions of said strip of film to facilitate film exposure operations;

a self-aligning support surface;

a normally inoperative processing station for treating incremental portions of said strip of film, after exposure thereof, with a processing fluid, said processing station including an applicator;

first means for progressively advancing said strip of film across said film gate to effect the exposure thereof and then across said support plate, said first means including at least one reel adapted to be driven by externally mounted drive means of such camera and/or projector; and second means for selectively rendering said processing station operable including means for causing said strip of film to be slidably engaged by said surface and said applicator.

References Cited

UNITED STATES PATENTS

| | | | |
|---|---|---|---|
| 2,727,446 | 12/1955 | Tuttle | 95—14 |
| 2,856,829 | 10/1958 | Orlando | 95—89 |
| 2,922,352 | 1/1960 | Tuttle | 95—14 X |
| 3,097,584 | 7/1963 | Wright | 95—89 MISC |
| 3,181,444 | 5/1965 | Takats et al. | 95—12 |
| 3,264,962 | 8/1966 | Dieffenbach | 95—89 X |
| 3,383,998 | 5/1968 | Takats | 95—90.5 |

JOHN M. HORAN, Primary Examiner

A. MATHEWS, Assistant Examiner

U.S. Cl. X.R.

95—13; 352—72